(12) United States Patent
Zou et al.

(10) Patent No.: US 9,689,772 B2
(45) Date of Patent: Jun. 27, 2017

(54) OPTICAL PULSE COMPRESSION REFLECTOMETER

(71) Applicant: Shanghai Jiao Tong University, Shanghai (CN)

(72) Inventors: Weiwen Zou, Shanghai (CN); Shuo Yang, Shanghai (CN); Xin Long, Shanghai (CN); Jianping Chen, Shanghai (CN)

(73) Assignee: Shanghai Jiao Tong University, Shanghai (CN)

(*) Notice: Subject to any disclaimer, the term of this patent is extended or adjusted under 35 U.S.C. 154(b) by 0 days.

(21) Appl. No.: 14/443,916

(22) PCT Filed: Jul. 1, 2014

(86) PCT No.: PCT/CN2014/081331
§ 371 (c)(1),
(2) Date: May 19, 2015

(87) PCT Pub. No.: WO2015/176362
PCT Pub. Date: Nov. 26, 2015

(65) Prior Publication Data
US 2016/0245719 A1    Aug. 25, 2016

(30) Foreign Application Priority Data
May 19, 2014  (CN) .......................... 2014 1 0211203

(51) Int. Cl.
*G01M 11/00*  (2006.01)

(52) U.S. Cl.
CPC ........ *G01M 11/31* (2013.01); *G01M 11/3109* (2013.01); *G01M 11/3145* (2013.01); *G01M 11/3154* (2013.01); *G01M 11/3172* (2013.01)

(58) Field of Classification Search
CPC ............. G01M 11/31; G01M 11/3109; G01M 11/3118; G01M 11/3127; G01M 11/3136; G01M 11/3145; G01M 11/3154; G01M 11/3163; G01M 11/3172; G01M 11/3181; H04B 10/071; H04B 10/0771; H04B 10/07955; H04B 10/07; H04B 10/0795;
(Continued)

(56) References Cited

U.S. PATENT DOCUMENTS 5,000,568 A * 3/1991 Trutna, Jr. .......... G01M 11/3118
250/227.15
5,307,140 A * 4/1994 Lewis ................ G01M 11/3172
356/73.1

(Continued)

*Primary Examiner* — Gordon J Stock, Jr.
(74) *Attorney, Agent, or Firm* — Mei & Mark LLP; Manni Li

(57) ABSTRACT

An optical pulse compression reflectometer is provided, which comprises: a single wavelength continuous optical source, an optical splitter, a modulation frequency pulse generating module, an optical directional coupler, an optical fiber under test, an optical coupler, a balanced photoelectric detector, and a pulse compression processing module. The present invention, in addition to overcoming the contradictory constraint between spatial resolution and measurement range in traditional time domain reflectometry and giving to full play the super spatial resolution from frequency modulation technology, has a longer measurement range than that in the optical frequency domain reflectometry.

11 Claims, 4 Drawing Sheets

(58) Field of Classification Search
CPC ............. H04B 10/0731; H04B 10/077; H04B 10/0775; H04B 10/0791
USPC ..................................................... 356/73.1
See application file for complete search history.

(56) References Cited

U.S. PATENT DOCUMENTS

| | | | | |
|---|---|---|---|---|
| 5,353,110 A | * | 10/1994 | Jones | G01M 11/3118 |
| | | | | 250/227.21 |
| 9,322,740 B2 | * | 4/2016 | Liu | G01D 5/35329 |
| 2008/0106731 A1 | * | 5/2008 | Iwasaki | G01M 11/3145 |
| | | | | 356/73.1 |

* cited by examiner (a)

(b)

(a)

(b)

(a)

(b)

US 9,689,772 B2

OPTICAL PULSE COMPRESSION REFLECTOMETER

CROSS REFERENCE TO RELATED APPLICATIONS

This application is the National Stage of International Application No. PCT/CN2014/081331, filed on Jul. 1, 2014, which claims the benefit of Chinese Application No. 201410211203.5, filed on May 19, 2014.

FIELD OF INVENTION

The present invention relates to an optical sensing device, and in particular relates to an optical time domain reflectometer based on pulse compression of a detection pulse.

BACKGROUND ART

Optical reflectometry finds wide application in optical sensing, its principle being: a beam of detection light is sent towards an optical fiber under test (FUT), and the intensity curve of a back scattered light detected via a photodetector is obtained to analyze loss and breaking points in the FUT. Traditional optical time-domain reflectometry uses an optical pulse as the detection light, and therefore its spatial resolution is determined by the pulse width, the narrower the pulse width, the higher the spatial resolution. However, in consideration of limitation on the output power of the optical pulse, the narrower the pulse width, the smaller its energy, which implicates that the detection light is liable of being submerged in noise. [M. K. Barnoski, M. D. Rourke, S. M. Jensen, R. T. Melville, "Optical time domain reflectometer, "Applied Optics, vol. 16, no. 9, pp. 2375-2379, 1977]. Hence, spatial resolution and measurement range in traditional optical time-domain technology are mutually restrictive with each other.

To overcome the bottlenecks in traditional optical time-domain reflectometry, optical frequency domain reflectometry is proposed. Optical frequency domain reflectometry uses continuous linear frequency modulation light as detection light, with a phase difference existing between optical signals reflected from different displacements in the fiber and the continuous linear modulation light to form optical beat frequency signals with various frequency differences. Said signals are transformed to photocurrents via a photoelectric detector and then mapped to frequency domains to obtain reflectometry information of the fiber. Spatial resolution of the frequency domain reflectometry depends only on the sweeping range of the linear modulation frequency, and hence there is no constraint between the spatial resolution and the measurement range. However, the measurement range is limited by the coherent length of the optical source, the maximum measurement range being approximately half of the coherent length, if the detection light were not to be being submerged in noise. [D. Uttam and B. Culshaw, "Precision time domain reflectometry in optical fiber systems using a frequency modulated continuous wave ranging technique,"Journal of Lightwave Technology, vol. 3, no. 5, pp. 971-977, 1985].

In comparison with radar technology, traditional optical time domain reflectometry is similar to pulse radar systems, while optical frequency domain reflectometry is likened in its working mechanism to frequency modulated continuous wave radar. In radar technology, there is a pulse compression technique with no contradictory constraints between the spatial resolution and the measurement range, whose spatial resolution depends only on its sweeping range, and whose measurement range goes farther than the frequency modulated continuous wave radar. [M. A. Richards, Fundamentals of radar signal processing, McGraw-Hill Education, 2005].

Therefore, by applying pulse compression radar techniques in optical time domain reflectometry, the contradictory constraint between spatial resolution and measurement range in traditional optical time domain reflectometry shall be overcome, superb spatial resolution of the pulse compression shall be in full display, and its measurement range shall be longer than that in the optical frequency domain reflectometry.

SUMMARY OF THE INVENTION

To overcome deficiency in the prior art, the present invention proposes an optical pulse compression reflectometer, with a higher spatial resolution than that of the traditional optical time domain reflectometry, and a longer measurement range than that of the optical frequency domain reflectometry.

The technical solution of the present invention is as follows:

An optical pulse compression reflectometer is featured to comprise: a single wavelength continuous optical source, an optical splitter, a modulation frequency pulse generating module, an optical directional coupler, an optical fiber under test, an optical coupler, a balanced photoelectric detector, and a pulse compression processing module;

The above components are inter-connected in the following manner:

An output port of said single wavelength continuous optical source is connected with an input port of said optical splitter, the first output port of the optical splitter is connected with the first port of the optical directional coupler en route of the said modulation frequency pulse generating module, the second port of the optical directional coupler is connected with said optical fiber under test, the third port of the optical directional coupler is connected with the first input port of the optical coupler, and the second output port of the optical splitter is connected with the second input port of the optical coupler;

Two outputs of the optical coupler are received in said balanced photoelectric detector, and the output port of the balanced photoelectric detector is connected with said pulse compression processing module.

An embodiment of the modulation frequency generating module comprises: a polarization controller, a linear modulation frequency voltage controlled oscillator, a waveform generator, a single sideband modulator, a second polarization controller, a first erbium-doped fiber amplifier, a Mach-Zehnder electro-optic modulator, and a second erbium-doped fiber amplifier;

Another embodiment of the modulation frequency generating module comprises: a polarization controller, a linear modulation frequency voltage controlled oscillator, a waveform generator, a single sideband modulator, and an erbium-doped fiber amplifier;

A wave output port of said waveform generator is connected with an input port of said linear modulation frequency voltage controlled oscillator, an output port of the linear modulation frequency voltage controlled oscillator is connected with an electric signal input port of said single sideband modulator, the first output port of the optical splitter is connected with an input port of the single sideband modulator en route of the first polarization controller, an output port of the single sideband modulator is connected with an input port of said Mach-Zehnder electro-optic modulator en route successively of the second polarization controller and the erbium-doped fiber amplifier, a pulse output port of the waveform generator is connected with an electric signal input port of the Mach-Zehnder electro-optic modulator, and an output port of the Mach-Zehnder electro-optic modulator is connected with the first port of the optical directional coupler.

The Mach-Zehnder electro-optic modulator is an intensity modulator, a single sideband modulator or an electro-absorption modulator.

Said pulse compression processing module comprises a data collector, an orthogonal modulator and a match filter, which are successively connected;

Said data collector collects an electric signal outputted by the balanced photoelectric detector, said orthogonal modulator quadrature demodulates the collected signal, and said match filter match filters the quadrature demodulated signal.

The data collector is an analogue reception circuit, an analogue-digital transforming module, a data collection card, or an oscilloscope.

The pulse compression processing module is an analogue signal processing circuit, a digital signal processor, or a computer software.

Said single wavelength continuous optical source is a semiconductor laser, an optical fiber laser, a gas laser, or a dye laser.

Said optical coupler is a 2×2 optical coupler.

Said balanced photoelectric detector is a PIN diode or an APD (avalanche photodiode).

Said optical directional coupler is an optical circulator or an optical coupler.

The working principle of the present invention is as follows:

The optical source is split into two branches, one as reference light for coherent detection, the other one is generated to be a frequency modulation pulse to serve as detection light, which is compressed to be a narrow pulse in time domain by means of pulse compression, with compression ratio depending only on the sweeping range and the pulse width. To be more specific, a monochromatic continuous optical signal generated by the single wavelength continuous optical source is split by the optical splitter; one branch of the split optical signal is transformed by the frequency modulation pulse generating module to be a frequency modulation pulse to serve as detection light; the detection light is outputted from one end of the optical directional coupler to the other end thereof and to the optical fiber under test, the back scattered light or the reflected light is outputted by the optical directional coupler; an input port of the optical coupler receives the back scattered light, while the other branch of light split by the optical splitter is received as reference light in the other port of the optical coupler; two outputs of the optical coupler are received in the balanced photoelectric detector for the coherent detection; the pulse compression processing module conducts the pulse compression on the coherent-detected signals.

In comparison with the prior art, the present invention has the following advantages:

1. The constraint between the spatial resolution and the measurement range in traditional optical time domain reflectometry is overcome, and a bigger measurement range than that in optical frequency domain reflectometry is obtained.

2. Just one laser source provides the detection light as well as the reference light for coherent detection, which is more easily implementable than the phase-compensation device in an optical frequency domain device with a longer measurement range than the coherent length of the laser source.

EMBODIMENTS

In combination with drawings and embodiments hereunder provided, the present invention will be further expounded. The embodiments, providing detailed implementation means and procedures thereof under prerequisite of the technical solution of the present invention, are not meant to limit the scope of the present invention.

Figure 1:
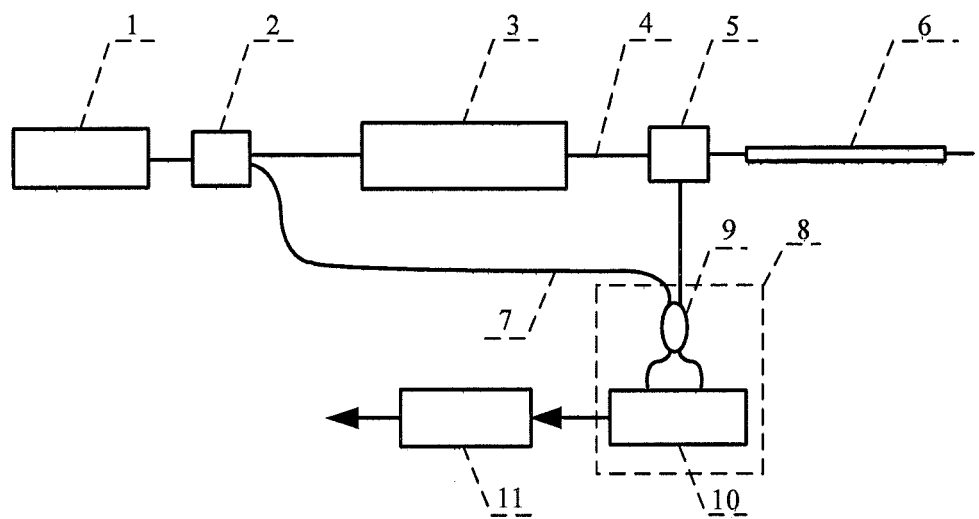
FIG. 1 is a schematic diagram of the optical pulse compression reflectometer of the present invention.

FIG. 1 is a schematic diagram of the optical pulse compression reflectometer of the present invention, as is shown thereon, it comprises: a single wavelength continuous optical source 1, an optical splitter 2, a modulation frequency pulse generating module 3, an optical directional coupler 5, an optical fiber under test 6, an optical coupler 9, a balanced photoelectric detector 10, and a pulse compression processing module 11;

The above components are inter-connected in the following manner:

A monochromatic continuous optical signal generated by the single wavelength continuous optical source is split by the optical splitter 2; the modulation frequency pulse generating module 3 transforms one branch of the split optical signal to be a modulation frequency pulse to serve as a detection light 4, the first port of the optical directional coupler 5 receives the detection light 4 and outputs it via the second port thereof to the optical fiber under test 6, and at the mean time, the second port of the optical directional coupler 5 receives the back scattered light generated by the optical fiber under test 6 and outputs it out of the third port thereof. The second input port of the optical coupler 9 receives the back scattered light, while the other branch of the split optical signal split by the optical splitter 2 is received in the first input port of the optical coupler 9 as a reference light 7; two outputs of the optical coupler 9 are received in the balanced photoelectric detector 10 for coherent detection; the pulse compression processing module 11 conducts pulse compression on the signal outputted from the balanced photoelectric detector 10.

Take linear frequency modulation as an example, denote the linear frequency modulation pulse with s(t), and the compressed pulse signal with y(t), then, $$s(t) = A rect\left(\frac{t}{T}\right) \exp[j\pi K t^2]$$

$$y(t) = A rect\left(\frac{t}{2T}\right) \frac{T \sin\left[\pi K T\left(1 - \frac{|t|}{T}\right)t\right]}{\pi K T t}$$

where A being the pulse amplitude, T being the pulse width, K being the frequency modulation ratio, and rect( ) denoting the rectangular function.

Figure 2:
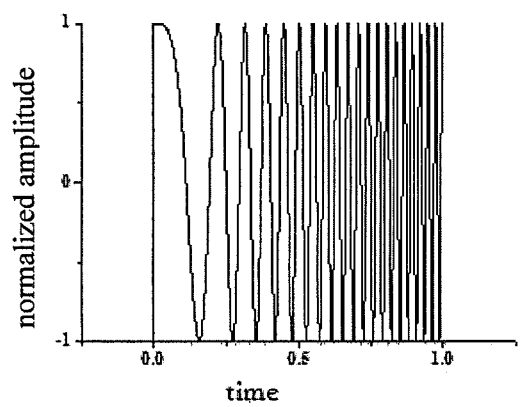
FIG. 2 is a schematic diagram showing pulse compression processing with the optical pulse compression reflectometer of the present invention, where (a) shows the original pulse, and (b) shows the compressed pulse.
Figure 2:
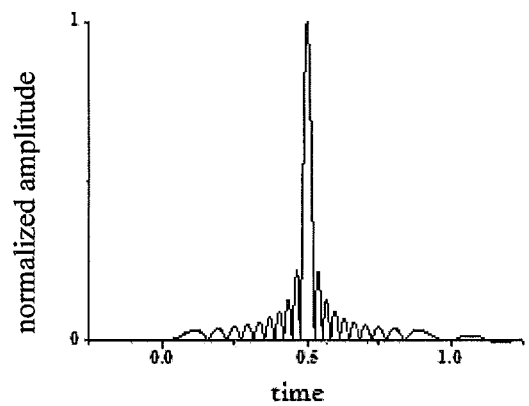

FIG. 2 shows a simulation diagram for the above process, that is, a diagram depicting the pulse compression of the pulse compression reflectometry system of the present invention, (a) showing the original pulse, and (b) showing the compressed pulse. Define the sweeping range as B=KT, then the pulse width shall be equal to the sweeping range B. Spatial resolution Z could be defined as a distance between two smallest discernible events, and in time domain reflectometry, it is equal to a product of the width of a detection pulse with the light speed in the medium. As the present invention is concerned, the spatial resolution depends only on the sweeping range B, $$Z = \frac{c}{2nB}$$

where c being the speed of light in vacuum, n being the refractive index of the medium.

Measurement range of a system could be defined as the maximum distance for maintenance of a greater event signal power over the noise power, and in time domain reflectometry, it increases as the pulse width increases. As the spatial resolution of the pulse compression reflectometry system of the present invention depends only on the sweeping range B but not on the pulse width, the pulse compression reflectometry system of the present invention is capable of drastically increasing the measurement range by means of increasing the pulse width with the spatial resolution unchanged. Moreover, as can be seen from FIG. 2, by employing pulse compression, energy originally evenly distributed is concentrated in a short time span, which increases the instantaneous power of the reflectometry signal at the event site, increases the signal/noise ratio, and further increases the measurement range.

Figure 3:
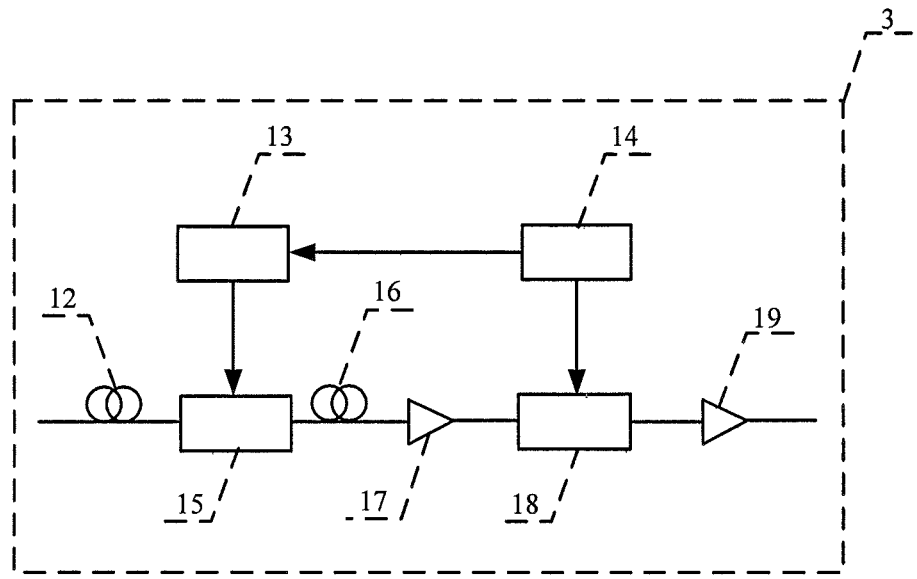
FIG. 3 is a schematic diagram showing embodiment 1 of the modulation frequency pulse generating module of the optical pulse compression reflectometer of the present invention.

FIG. 3 shows embodiment 1 of the modulation frequency pulse generating module of the optical pulse compression reflectometer of the present invention. As is shown thereon, the modulation frequency pulse generating module comprises: a first polarization controller 12, a linear modulation frequency voltage controlled oscillator 13, a waveform generator 14, a single sideband modulator 15, a second polarization controller 16, a first erbium-doped fiber amplifier 17, a Mach-Zehnder electro-optic modulator 18, and a second erbium-doped fiber amplifier 19. Components in the embodiment 1 of the modulation frequency pulse generating module are inter-connected in the following manner the waveform generator 14 generates a periodical sawtooth wave to drive the linear modulation frequency voltage controlled oscillator 13, and connects the output port of the linear modulation frequency voltage controlled oscillator 13 with the electric signal input port of the single sideband modulator 15; subsequently, one branch of optical signal split by the optical splitter 2 is received in the single sideband modulator 15 en route of the first polarization controller 12; the output signal from the single sideband modulator 15 is received in the Mach-Zehnder electro-optic modulator 18 en route of the second polarization controller 16 and the first erbium-doped fiber amplifier 17; at the mean time, the waveform generator 14 generates a pulse synchronous with the periodical sawtooth wave for reception in the electric signal input port of the Mach-Zehnder electro-optic modulator 18; the output optical signal from the Mach-Zehnder electro-optic modulator 18 is generated to be the detection light 4 via the second erbium-doped fiber amplifier 19

Figure 4:
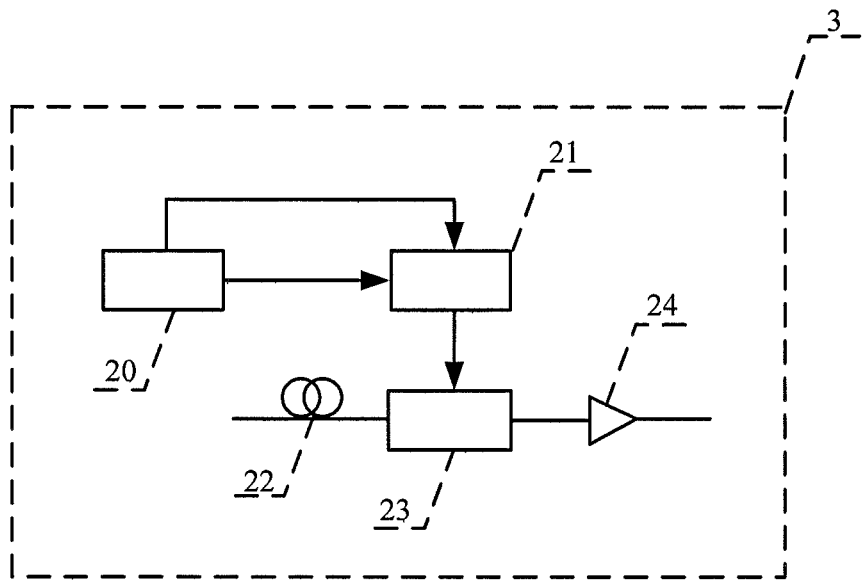
FIG. 4 is a schematic diagram showing embodiment 2 of the modulation frequency pulse generating module of the optical pulse compression reflectometer of the present invention.

FIG. 4 shows embodiment 2 of the modulation frequency pulse generating module of the optical pulse compression reflectometer of the present invention. As is shown thereon, the modulation frequency pulse generating module comprises: a waveform generator 20, a linear modulation frequency voltage controlled oscillator 21, a polarization controller 22, a single sideband modulator 23, and an erbium-doped fiber amplifier 24. Components in the embodiment 2 of the modulation frequency pulse generating module are inter-connected in the following manner: the waveform generator 20 generates two branches of optical signal, one is a periodical sawtooth wave, for reception in the electric signal input port of the linear modulation frequency voltage controlled oscillator 21; the other branch of optical signal is a periodical pulse signal, with a pulse width being equal to the period of the above periodical sawtooth wave, for reception in the enable input port of the linear modulation frequency voltage controlled oscillator 21. An output port of the linear modulation frequency voltage controlled oscillator 21 is connected with an electric signal input port of the single sideband modulator 23; subsequently, one branch of optical signal split by the optical splitter 2 is received in the single sideband modulator 23 en route of the polarization controller 22; the output optical signal from the single sideband modulator 23 is generated to be the detection light 4 via the erbium-doped fiber amplifier 24.

Figure 5:
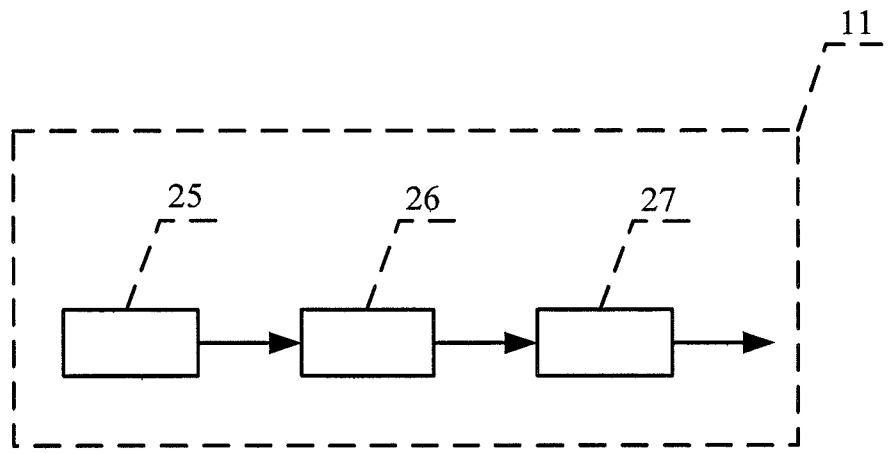
FIG. 5 is a schematic diagram of the pulse compression processing module of the optical pulse compression reflectometer of the present invention.
Figure 6:
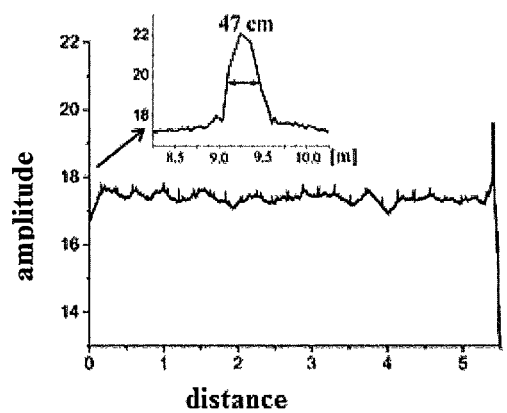
FIG. 6 shows experiment results for the optical pulse compression reflectometer of the present invention under embodiment 1 of the modulation frequency pulse generating module, where (a) shows a back scattered curve, (b) shows validation for the spatial resolution. (Conditions for the experiment: pulse width 2 sweeping range 221 MHz, linewidth of the laser source 100 kHz, spatial resolution approximately 50 cm, and measurement range 5.4 km).
Figure 6:
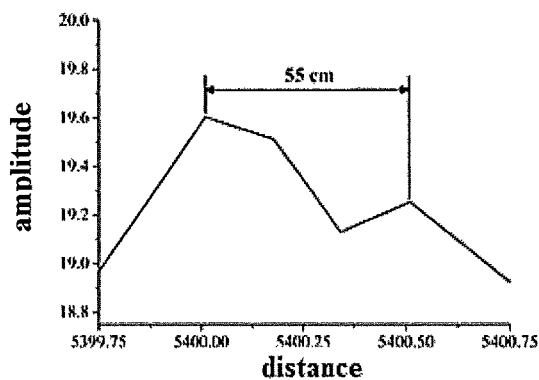
Figure 7:
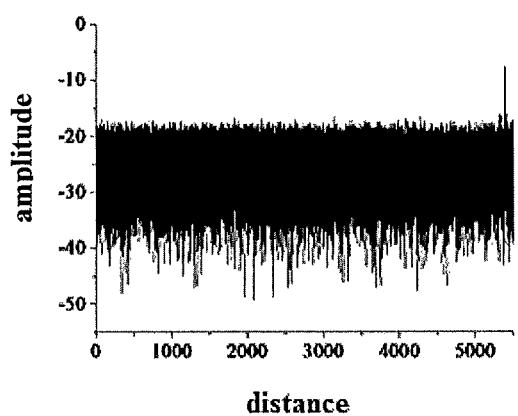
FIG. 7 shows experiment results for the optical pulse compression reflectometer of the present invention under embodiment 2 of the modulation frequency pulse generating module, where (a) shows a back scattered curve, (b) shows validation for the spatial resolution. (Conditions for the experiment: pulse width 1 µs, sweeping range 1 GHz, linewidth of the laser source 100 kHz, spatial resolution approximately 100 cm, and measurement range 5.4 km).
Figure 7:
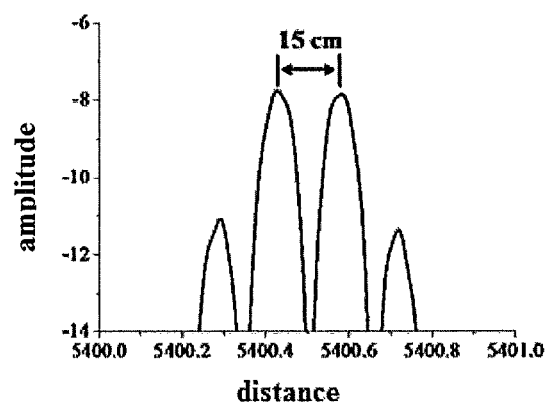

FIG. 5 shows a schematic diagram of the pulse compression processing module of the optical pulse compression reflectometer of the present invention. As is shown thereon, the pulse compression processing module comprises a data collector 25, an orthogonal modulator 26 and a match filter 27, which are successively connected. The data collector 25 collects an electric signal outputted by means of the coherent detection 8; said orthogonal modulator 26 quadrature demodulates the collected signal, and said match filter 27 match filters the quadrature demodulated signal.

The working principle of the present invention is as follows:

For a linear modulation frequency voltage controlled oscillator, being driven by a periodical sawtooth wave, outputs a continuous wave of linear frequency sweep. For a single sideband modulator, it merely modulates an input electric signal to either the upper sideband or the lower sideband, and therefore, the frequency of the output optical signal is in linear relation with the input electric signal. In embodiment 1 of the modulation frequency pulse generating module, subsequent to reception of a continuous light of linear frequency sweep generated by the linear modulation frequency voltage controlled oscillator, the single sideband modulator will generate a continuous light of linear frequency sweep. Pass the continuous light of linear frequency sweep through the Mach-Zehnder electro-optic modulator, modulate up a pulse synchronous with the periodical sawtooth wave, and an optical pulse of linear frequency sweep will be obtained. In embodiment 2 of the modulation frequency pulse generating module, receive a pulse synchronous with the periodical sawtooth wave in an enable port of the linear modulation frequency voltage controlled oscillator, the linear modulation frequency voltage controlled oscillator will directly generate an electric pulse of linear frequency sweep. Hence, subsequent to reception of the electric pulse of linear frequency sweep generated by the linear modulation frequency voltage controlled oscillator, the single sideband modulator will directly generate an optical signal of linear frequency sweep.

Conduct optical interference on the back scattered light and the reference light of the optical fiber via the optical coupler, and subsequently conduct coherent detection via the balanced photoelectric detector to obtain electric field and frequency modulation information of the optical signal. Collect said information with the data collector, transform the obtained real signal to a complex signal, shift the center frequency of the signal downward to intermediate frequency or zero point, and then conduct match filtering, and the pulse compression will be realized with the signal/noise ratio of the back scattered signal drastically increased.

The invention claimed is:

1. An optical pulse compression reflectometer, comprising
a single wavelength continuous optical source,
an optical splitter,
a modulation frequency pulse generator,
an optical directional coupler,
an optical fiber under test,
an optical coupler,
a balanced photoelectric detector photodetector, and
a pulse compression processor;
wherein an output port of said single wavelength continuous optical source is connected with an input port of said optical splitter,
a first output port of the optical splitter is connected with a first port of the optical directional coupler en route of the modulation frequency pulse generator,
a second port of the optical directional coupler is connected with said optical fiber under test,
a third port of the optical directional coupler is connected with a first input port of the optical coupler, and a second output port of the optical splitter is connected with a second input port of the optical coupler; and
two branches of output of the optical coupler are received in said balanced photodetector, and an output port of the balanced photodetector is connected with said pulse compression processor.

2. The optical pulse compression reflectometer of claim 1, wherein the modulation frequency pulse generator comprises
a waveform generator,
a linear modulation frequency voltage controlled oscillator,
a polarization controller,
a single sideband modulator, and
an erbium-doped fiber amplifier;
wherein two output ports of the waveform generator are respectively connected with an electric signal input port and an enable signal input port of the linear modulation frequency voltage controlled oscillator, an output port of the linear modulation frequency voltage controlled oscillator is connected with an electric signal input port of the single sideband modulator, the first output port of the optical splitter is connected with an input port of the single sideband modulator en route of the polarization controller, and an output port of the single sideband modulator is connected with an input port of the optical directional coupler en route of the erbium-doped fiber amplifier.

3. The optical pulse compression reflectometer of claim 1, wherein the single wavelength continuous optical source is a semiconductor laser, an optical fiber laser, a gas laser, or a dye laser.

4. The optical pulse compression reflectometer of claim 1, wherein the optical coupler is a 2.times.2 optical coupler.

5. The optical pulse compression reflectometer of claim 1, wherein the balanced photodetector is a PIN diode or an APD.

6. The optical pulse compression reflectometer of claim 1, wherein the optical directional coupler is an optical circulator or an optical coupler.

7. The optical pulse compression reflectometer of claim 1, wherein the pulse compression processor comprises a data collector, an orthogonal modulator, and a match filter that are successively connected; the data collector collects an electric signal outputted by the balanced photodetector, said orthogonal modulator quadrature demodulates the collected signal, and said match filter match filters the quadrature demodulated signal.

8. The optical pulse compression reflectometer of claim 1, wherein the modulation frequency pulse generator comprises
a first polarization controller,
a linear modulation frequency voltage controlled oscillator,
a waveform generator,
a single sideband modulator,
a second polarization controller,
a first erbium-doped fiber amplifier,
a Mach-Zehnder electro-optic modulator, and
a second erbium-doped fiber amplifier;
wherein a wave output port of said waveform generator is connected with an input port of said linear modulation frequency voltage controlled oscillator,
an output port of the linear modulation frequency voltage controlled oscillator is connected with an electric signal input port of said single sideband modulator,
the first output port of the optical splitter is connected with an input port of the single sideband modulator en route of the first polarization controller,
an output port of the single sideband modulator is connected with an input port of said Mach-Zehnder electro-optic modulator en route successively of the second polarization controller and the erbium-doped fiber amplifier,
a pulse output port of the waveform generator is connected with an electric signal input port of the Mach-Zehnder electro-optic modulator, and an output port of the Mach-Zehnder electro-optic modulator is connected with an input port of the optical directional coupler.

9. The optical pulse compression reflectometer of claim 7, wherein the data collector is an analogue reception circuit, an analogue-digital transformer, a data collection card, or an oscilloscope.

10. The optical pulse compression reflectometer of claim 8, wherein the Mach-Zehnder electro-optic modulator is an intensity modulator, a single sideband modulator, or an electro-absorption modulator.

11. The optical pulse compression reflectometer of claim 10, wherein the pulse compression processor is an analogue signal processing circuit or a digital signal processor.

* * * * *